US010103652B2

(12) United States Patent
Jaffrey (10) Patent No.: US 10,103,652 B2
(45) Date of Patent: Oct. 16, 2018

(54) PIEZOELECTRIC GENERATOR FOR HYDRAULIC SYSTEMS (71) Applicant: Cameron International Corporation, Houston, TX (US)

(72) Inventor: Andrew Jaffrey, Inverurie (GB)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/477,828

(22) Filed: Apr. 3, 2017

(65) Prior Publication Data
US 2017/0207731 A1 Jul. 20, 2017

Related U.S. Application Data (62) Division of application No. 14/680,938, filed on Apr. 7, 2015, now Pat. No. 9,634,581.

(51) Int. Cl.
| *H02N 2/18* | (2006.01) |
| *E21B 47/00* | (2012.01) |
| *E21B 41/00* | (2006.01) |
| *E21B 33/035* | (2006.01) |
| *E21B 33/06* | (2006.01) |
| *E21B 33/064* | (2006.01) |

(52) U.S. Cl.
CPC .......... *H02N 2/185* (2013.01); *E21B 33/035* (2013.01); *E21B 33/061* (2013.01); *E21B 33/064* (2013.01); *E21B 41/0085* (2013.01); *E21B 47/00* (2013.01)

(58) Field of Classification Search
CPC ... H02N 2/185; E21B 41/0085; E21B 17/003; E21B 28/00
See application file for complete search history.

(56) References Cited

U.S. PATENT DOCUMENTS

| 3,166,684 | A | * | 1/1965 | Williams | .............. | B06B 1/0618 |
| | | | | | | 310/339 |
| 6,011,346 | A | | 1/2000 | Buchanan et al. | | |
| 6,199,629 | B1 | | 3/2001 | Shirk et al. | | |
| 6,768,214 | B2 | * | 7/2004 | Schultz | ................... | E21B 28/00 |
| | | | | | | 290/1 R |
| 6,801,135 | B2 | | 10/2004 | Schultz et al. | | |
| 7,762,354 | B2 | | 7/2010 | Garcia-Osuna | | |
| 8,426,988 | B2 | * | 4/2013 | Hay | .................... | E21B 41/0085 |
| | | | | | | 166/66.5 |

(Continued)

FOREIGN PATENT DOCUMENTS

| WO | WO0210553 | 2/2002 |
| WO | WO2005078233 | 8/2005 |
| WO | WO2008076809 | 6/2008 |

OTHER PUBLICATIONS

International Preliminary Report on Patentability of corresponding PCT Application No. PCT/US2016/025348 dated Oct. 19, 2017: pp. 1-8.

*Primary Examiner* — James G Sayre
(74) *Attorney, Agent, or Firm* — Helene Raybaud (57) ABSTRACT A piezoelectric power generator assembly includes a housing, a piezoelectric transducer located in the housing, and a piston located in the housing. The piston is movable with respect to the housing and is configured to be moved into contact with the piezoelectric transducer, and the piezoelectric transducer is configured to generate an electrical charge when contacted by the piston.

16 Claims, 7 Drawing Sheets

(56) References Cited

U.S. PATENT DOCUMENTS

| | | | |
|---|---|---|---|
| 2002/0096887 A1* | 7/2002 | Schultz | E21B 28/00 |
| | | | 290/54 |
| 2008/0247273 A1* | 10/2008 | Chemali | E21B 17/028 |
| | | | 367/82 |
| 2008/0252174 A1 | 10/2008 | Mohammadi et al. | |
| 2013/0073003 A1* | 3/2013 | Pless | A61N 1/3785 |
| | | | 607/61 |
| 2013/0113213 A1 | 5/2013 | Yarnold et al. | |
| 2013/0153242 A1 | 6/2013 | Flight et al. | |
| 2014/0126332 A1 | 5/2014 | Skinner | |
| 2014/0166264 A1 | 6/2014 | Judge et al. | |
| 2016/0010418 A1* | 1/2016 | Van Wijk | E21B 33/0355 |
| | | | 166/363 |

\* cited by examiner

PIEZOELECTRIC GENERATOR FOR HYDRAULIC SYSTEMS

CROSS-REFERENCE TO RELATED APPLICATION

This application is a divisional of U.S. application Ser. No. 14/680,938, entitled "PIEZOELECTRIC GENERATOR FOR HYDRAULIC SYSTEMS," filed Apr. 7, 2015, which is hereby incorporated by reference in its entirety for all purposes.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art In modern hydrocarbon drilling and production operations, there is an ever-increasing need to add more sensors and instrumentation to equipment. However, the installation of additional sensors and instrumentation with subsea hydrocarbon drilling and production operations raises challenges regarding the infrastructure needed to supply power and handle communications to and from these sensors and instrumentation. Since subsea conditions can be hostile, minimizing the number and size of equipment near a well, such as wires or external batteries, is a common objective. Accordingly, there is a need for subsea electrical power generation to power components on a subsea assembly while minimizing the number and size of additional pieces of equipment required.

BRIEF DESCRIPTION OF THE DRAWINGS

Illustrative embodiments of the present disclosure are described in detail below with reference to the attached drawing figures, which are incorporated by reference herein and wherein.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

The present disclosure relates generally to electrical power generation and, in an embodiment described herein, more particularly provides a piezoelectric power generator assembly that generates an electrical charge under mechanical strain. The electrical charge is usable, for instance, to power electrically operated devices and to charge devices, such as capacitors. The mechanical strain is generated by harnessing the power of fluids already present at the subsea installation by applying these to piezoelectric materials. Piezoelectric power generators according to this disclosure can be retrofitted to existing equipment without the downside of having to add more cabling to the installation. Sensors and recording of measurements from same is possible during periods when subsea equipment, such as a blowout preventer, is disconnected from the main power supply, such as would happen after an Emergency Disconnect Sequence. The range of monitored situations of safety critical equipment, such as blowout preventer, is thereby increased.

Figure 1:
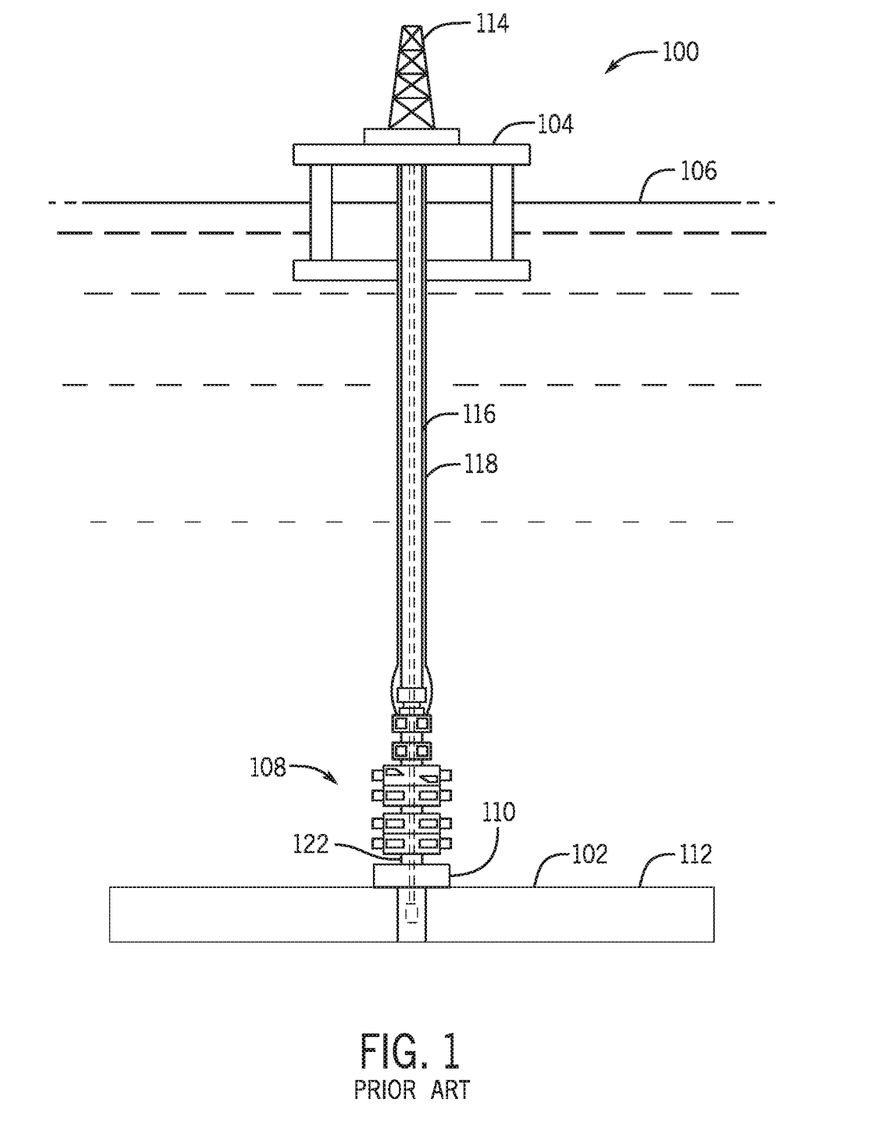
FIG. 1 is a schematic view of an example drilling system.

Referring now to FIG. 1, an embodiment of an offshore system 100 for drilling and/or producing a wellbore 102 is shown. In this embodiment, the system 100 includes an offshore vessel or platform 104 at the sea surface 106 and a subsea blowout preventer ("BOP") stack assembly 108 mounted to a wellhead 110 at the sea floor 112. The platform 104 is equipped with a derrick 114. A tubular drilling riser 116 extends from the platform 104 to the BOP stack assembly 108. The drilling riser 116 returns drilling fluid or mud to the platform 104 during drilling operations. One or more hydraulic conduits 118 extend along the outside of the riser 116 from the platform 104 to the BOP stack assembly 108. The conduits 118 supply pressurized hydraulic fluid to the BOP assembly 108.

Figure 2:
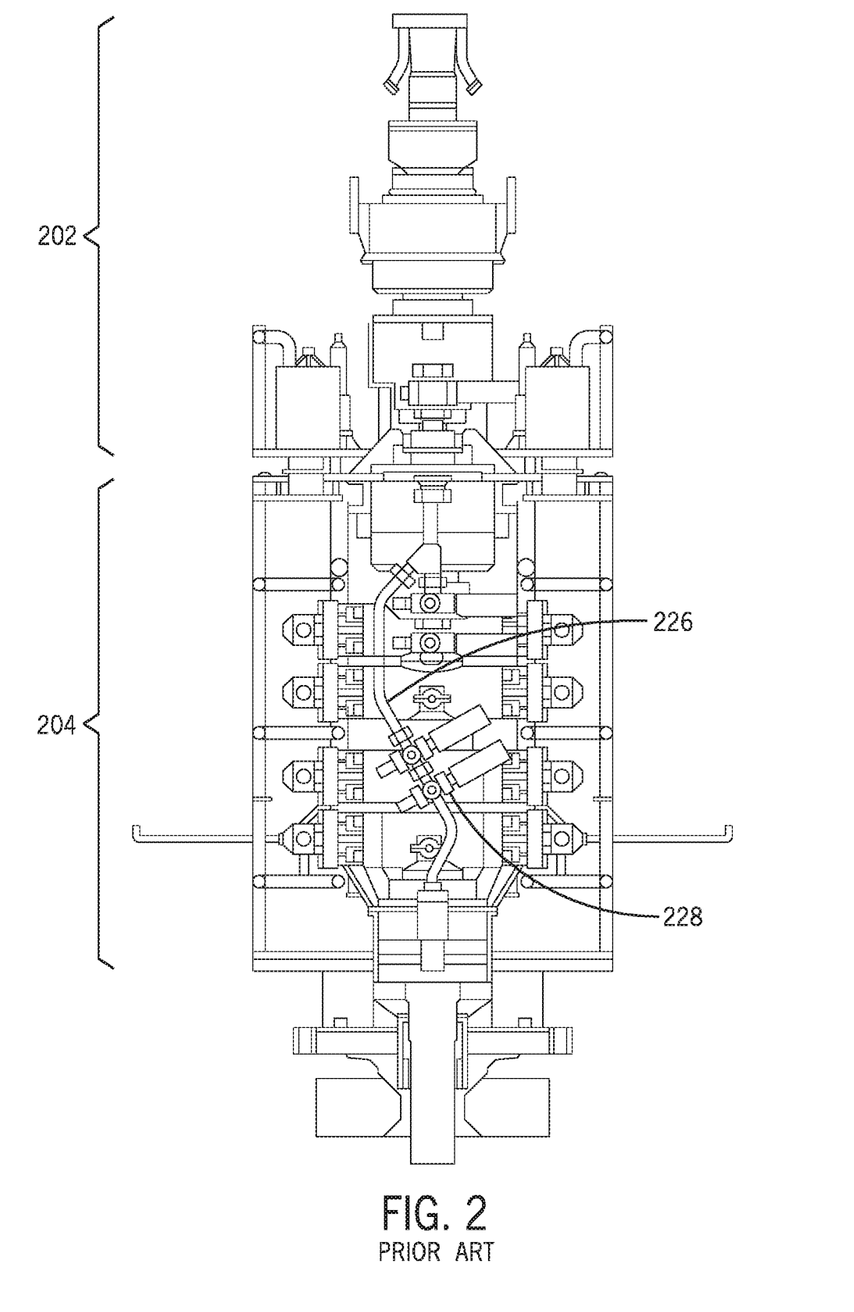
FIG. 2 is a front elevation view of a blowout preventer stack and lower marine riser package.

Referring now to FIGS. 1 and 2, the BOP stack assembly 108 is mounted to the wellhead 110 and is designed and configured to control and seal the wellbore 102, thereby containing the hydrocarbon fluids (liquids and gases) therein. In this embodiment, the BOP stack assembly 108 comprises a lower marine riser package ("LMRP") 202 and a BOP or BOP stack 204.

The BOP stack 204 is releasably secured to the wellhead 110 as well as the LMRP 202. Likewise, the LMRP 202 is releasably secured to the BOP stack 204 and the riser 116. In this embodiment, the connections between the wellhead 110, the BOP stack 204, and the LMRP 202 include hydraulically actuated, mechanical wellhead-type connections 122. In general, the connections 122 may comprise any suitable releasable wellhead-type mechanical connection such as the DWHC or HC profile subsea wellhead system available from Cameron International Corporation of Houston, Tex., or any other such wellhead profile available from several subsea wellhead manufacturers. Typically, such hydraulically actuated, mechanical wellhead-type connections (e.g., connections 122) include an upward-facing male connector, or "hub," that is received by and releasably engages a downward-facing mating female connector or receptacle. In this embodiment, the connection between LMRP 202 and the riser 116 is a flange connection that is remotely controlled, just as the connections 122 may be remotely, hydraulically controlled.

The blowout preventer assembly 108 contains hydraulic conduits or piping 226 for conveying hydraulic fluid throughout the assembly. In FIG. 2, the illustrated hydraulic conduits 226 are limited in number for ease of viewing and explanation. However, it is known to those of ordinary skill in the art that a blowout preventer assembly may comprise numerous hydraulic conduits for distributing hydraulic fluid to a number of points on the blowout preventer, such as an actuator (e.g., valve 228).

Figure 3:
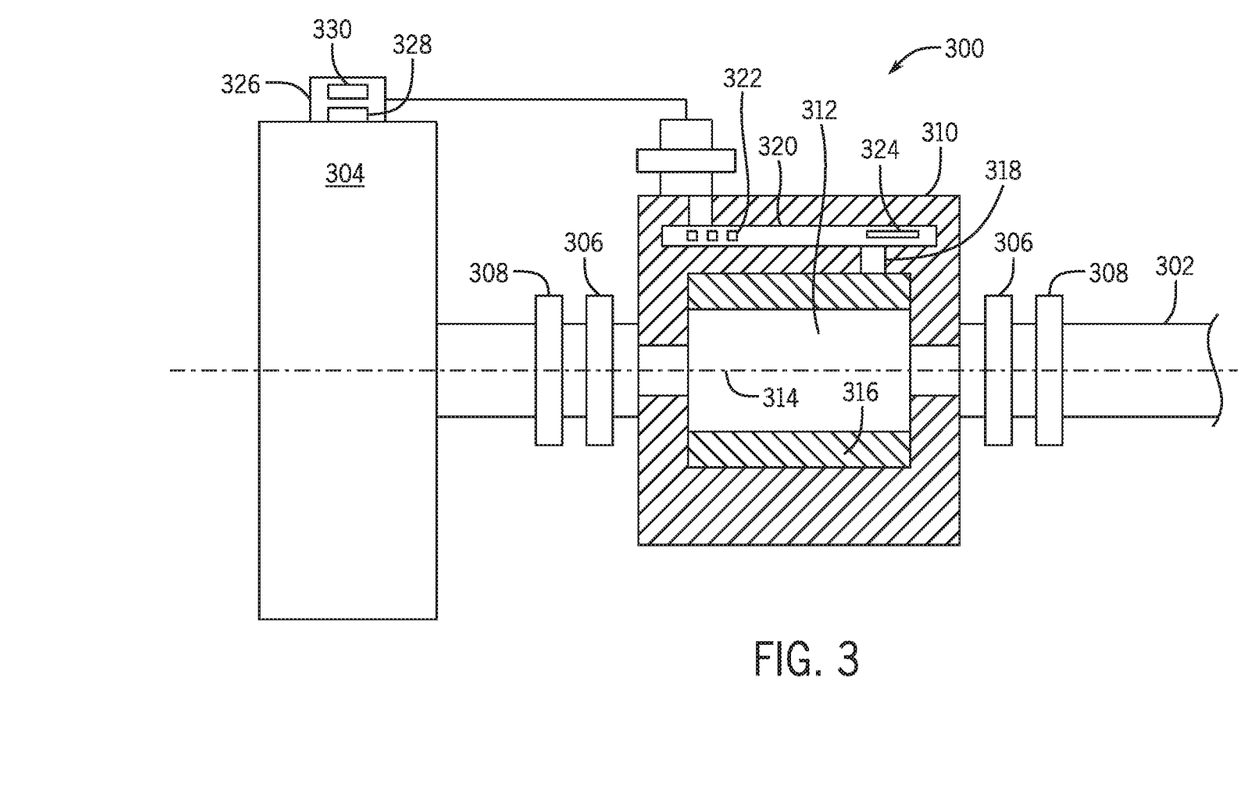
FIG. 3 is a cross-sectional view of an embodiment of an in-line piezoelectric power generator assembly adjacent a valve block.

A cross-section of an example of a piezoelectric power generator assembly 300 is illustrated in FIG. 3. In the illustrated embodiment, the piezoelectric power generator assembly 300 is disposed in-line with a fluid conduit 302. The fluid conduit 302 can be any type of fluid conduit for conveying a fluid, whether located subsea or at a surface location. In the embodiment illustrated in FIG. 3, the fluid conduit is a hydraulic fluid conduit for conveying pressurized hydraulic fluid on a blowout preventer assembly, such as those illustrated in FIGS. 1 and 2. The piezoelectric power generator assembly 300 is located in-line with the fluid conduit adjacent a valve block assembly 304. The piezoelectric power generator assembly 300 includes end fittings 306 for coupling the assembly 300 to end fittings 308 of the fluid conduit 302. Accordingly, the piezoelectric power generator assembly 300 can be retrofitted to an existing fluid conduit. Alternatively, the piezoelectric power generator assembly 300 can be integral to the fluid conduit, i.e., installed in-line without end fittings of any kind.

The piezoelectric power generator assembly 300 includes a housing 310. The illustrated housing 310 is shown having a square cross-sectional profile. However, other geometries are envisioned. The housing 310 includes a flow passage 312 defined within the interior of the housing 310 along a longitudinal axis 314 of the housing 310. Pressurized hydraulic fluid for actuating the valve block assembly 304 travels through the fluid conduit 302, through the flow passage 312, and to the valve block 304. The pressurized hydraulic fluid can be used to, e.g., operate a valve member (not shown) disposed within the valve block assembly 304. Since the piezoelectric power generator assembly 300 is in-line, it does not restrict the flow of the fluid through the conduit 302.

The housing 310 includes a piezoelectric transducer 316 composed of a piezoelectric material. Non-limiting examples of suitable piezoelectric materials include crystals (such as quartz, Berlinite and Rochelle salt) and ceramics (such as Lead Zirconate Titanate (PZT), Barium Titanate and Lithium tantalate). However, any piezoelectric material capable of accumulating an electrical charge in response to an applied mechanical stress can be used. The piezoelectric transducer 316 is disposed about the perimeter of the flow passage 312. Accordingly, the piezoelectric transducer 316 is exposed to the fluid pressure which applies a stress on the piezoelectric transducer 316 (pressurized hydraulic fluid in a subsea fluid conduit is at a pressure higher than ambient pressure, sometimes several thousand pounds per square inch). As a result of the Piezoelectric Effect, the piezoelectric transducer 316 generates an electrical charge in response to the stress.

The generated electrical charge can be passed via wires 318 to any electrically powered device or to a capacitor bank for storage. Such electrically powered devices or capacitors may be local (e.g., on the housing 310 or valve block assembly 304), or may be remote (e.g., many feet or miles away). In the illustrated embodiment, the generated electrical charge is passed to an electronics module 320. The electronics module 320 includes a capacitor bank 322 for storing the generated electricity and a power conditioning unit 324 for improving the quality of the electrical power delivered to other devices. The electronics module 320 could further include any other components commonly used for storing and distributing electricity.

The valve block assembly 304 further includes a sensor unit 326 located on top of the valve block assembly 304. The sensor unit 326 could be located at any location on the valve block assembly 304, or even remotely relative the valve block assembly 304. The sensor unit 326 includes a sensor 328 for measuring characteristics of the valve block assembly and a storage device 330 capable of receiving and storing sensor 328 measurement data. One suitable sensor is a Hall-Effect sensor which could be attached to the outside of the valve block assembly 304. A Hall-Effect sensor would provide for detection of fully open and fully closed states of the valve block assembly 304 by detecting the presence or absence of valve components as they shuttle between positions. Other types of sensors could also be incorporated for detecting various characteristics of the valve block assembly 304, such as temperature, pressure, strain, etc. The storage device 330 receives and stores the sensor 328 measurement data. These data can be wirelessly transferred to a remote location (e.g., to the surface if the sensor is subsea) or can be recovered locally at the sensor (e.g., by a remotely operated vehicle with corresponding electronics). One of several wireless options is inclusion of a radio frequency identification ("RFID") chip, or similar. The RFID tag can be incorporated into storage device 330 to allow data from sensor 328 to be communicated to a remotely operated vehicle bringing a reading wand into the vicinity of the RFID tag in order to stimulate the tag and download the data. Alternatively, a technician at the surface using a reading wand can scan the tag to effect a data download.

The sensor unit 326 can be powered entirely, or in part, by electricity generated by the piezoelectric power generator assembly 300, providing for a battery-free, independent, locally powered system. Such a system could be incorporated anywhere in a surface or subsea drilling or production installation where sensing is desired without increasing the complexity of the system.

Figure 4:
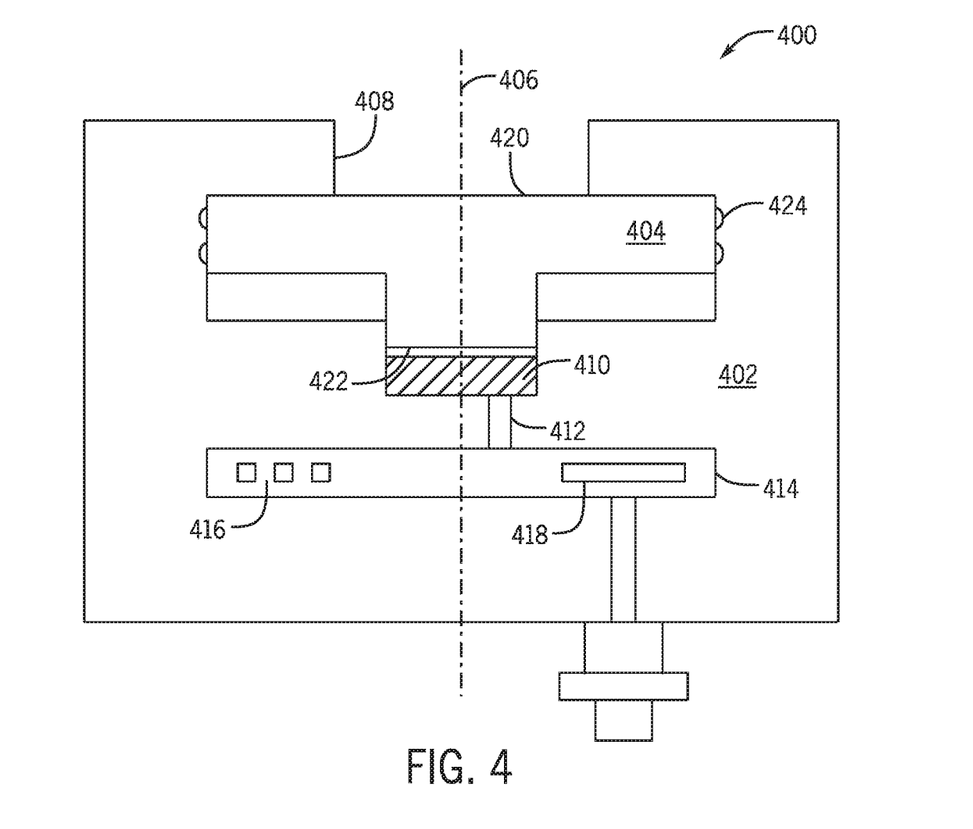
FIG. 4 is a cross-sectional view of an embodiment of a piezoelectric power generator assembly exposed to seawater and including a force-multiplying piston.

A cross-section of an example of a piezoelectric power generator assembly 400 is illustrated in FIG. 4. In the illustrated embodiment, the piezoelectric power generator assembly 400 includes a housing 402. The housing 402 can be constructed of any suitable material, including 316 stainless steel, super-duplex stainless steel and Polyether Ether Ketone (PEEK). In addition, the housing can be constructed of a piezoelectric material, which will be discussed below.

The housing 402 includes a piston 404 disposed within the housing 402. The piston is movable within the housing 402 along the longitudinal axis 406 of the housing 402. A fluid in an environment external to the housing 402 acts on the piston 404 through an opening 408 in the housing 402. In the illustrated embodiment, the housing 402 is located subsea. Accordingly, the hydrostatic pressure of seawater at depth applies a force on the piston 404, causing the piston 404 to move downward. However, any fluid at pressure suitable for applying a force on the piston 404 such that the piston 404 moves in such a way that it applies a compressive force on the piezoelectric element 410 is envisioned.

The piston includes an upper surface 420 and a lower surface 422. The upper surface 420 area is greater than the lower surface 422 area. Accordingly, any force acting on the upper surface 420 will be multiplied when the lower surface 422 comes into contact with another surface. This is known as "force multiplying." The piston 404 further includes seals 424 for preventing fluid access into the interior of the housing 402 beyond the piston.

The housing 402 further includes a piezoelectric transducer 410 composed of a piezoelectric material. Non-limiting examples of suitable piezoelectric materials include crystals (such as quartz, Berlinite and Rochelle salt) and ceramics (such as Lead Zirconate Titanate (PZT), Barium Titanate and Lithium Tantalate). However, any piezoelectric material capable of accumulating an electrical charge in response to an applied mechanical stress can be used. The piezoelectric transducer 410 is disposed below the piston 404. Accordingly, the piezoelectric transducer 410 is configured to come into physical contact with the piston 404 when the piston 404 moves downward, thereby applying a force on the piezoelectric transducer 410. As a result of the Piezoelectric Effect, the piezoelectric transducer 410 produces an electrical charge, or electricity, in response to the load. Owing to the force multiplying effect of piston 404, the force acting on the piezoelectric transducer 410 will be of greater magnitude than the force acting on the piston 404. As the force acting on the piezoelectric transducer 410 is proportional to the electrical charge generated, a greater force will generate more electrical charge.

As noted above, the housing 402 can be constructed of a piezoelectric material, in whole or in part. In this instance, the piezoelectric material of the housing would be under constant strain from the hydrostatic pressure of seawater at depth, thereby generating an electrical charge at all times. The force multiplying piston 404 arrangement can still be incorporated into a housing constructed of piezoelectric material in order to take advantage of the force multiplying effect on electrical charge generation. Alternatively, the housing could be stand alone, without any piston element.

The generated electrical charge can be passed via wires 412 to any electrically powered device or to a capacitor bank for storage. Such electrically powered devices or capacitors may be local (e.g., on the housing 402), or may be remote (e.g., many feet or miles away). In the illustrated embodiment, the electrical charge is passed to an electronics module 414. The electronics module 414 includes a capacitor bank 416 for storing the generated electricity and a power conditioning unit 418 for improving the quality of the electrical power delivered to other devices.

Figure 5:
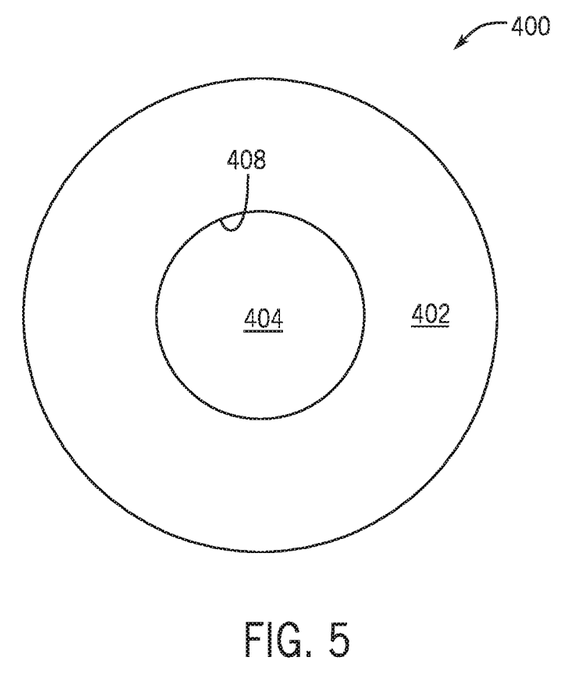
FIG. 5 is a top elevation view of an embodiment of a piezoelectric power generator assembly exposed to seawater and including a force-multiplying piston.

A top elevation view of an example of the piezoelectric power generator assembly 400 illustrated in FIG. 4 is shown in FIG. 5. In the illustrated embodiment, the housing 402 is shown to have a circular geometry. However, other geometries are envisioned. The piston 404 is disposed concentrically within the housing 402. The opening 408 allows a fluid located in an environment external to the housing 402 to act on the piston 404, causing the piston 404 to move downward. The piston 404 further includes seals (424 in FIG. 4) for preventing fluid access into the interior of the housing 402 beyond the piston.

Figure 6:
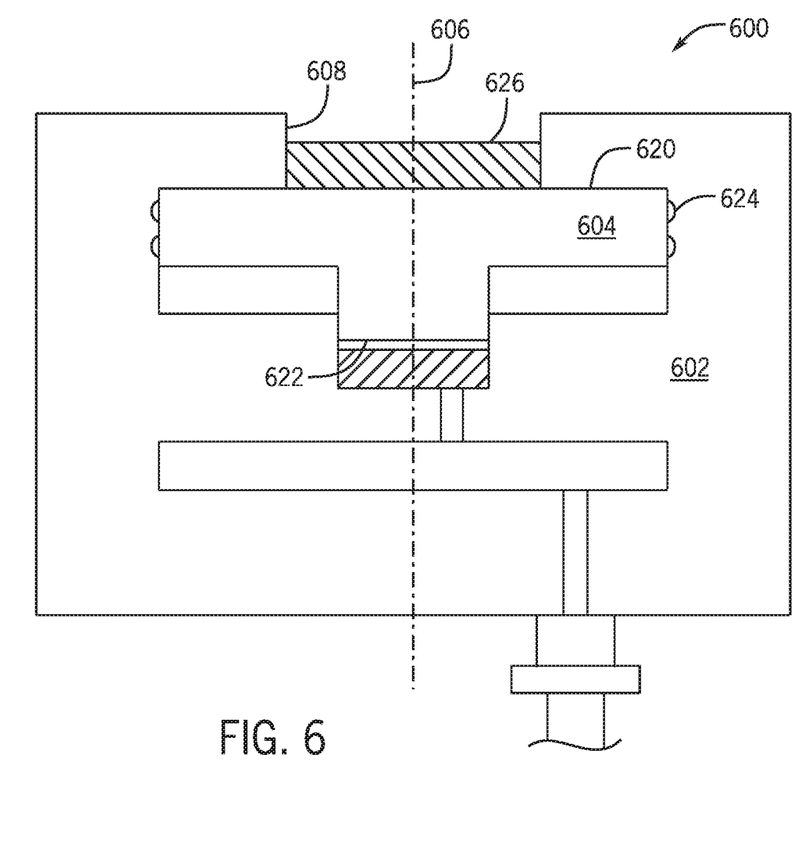
FIG. 6 is a cross-sectional view of an embodiment of a piezoelectric power generator assembly exposed to seawater and including a force-multiplying piston and further including a diaphragm.

A cross-section of an example of a piezoelectric power generator assembly 600 is illustrated in FIG. 6. In the illustrated embodiment, the piezoelectric power generator assembly 600 includes a housing 602. The housing 602 can be constructed of any suitable material, including stainless steel, super-duplex stainless steel and Polyether Ether Ketone (PEEK). In addition, the housing 602 can be constructed of a piezoelectric material.

The housing 602 includes a piston 604 disposed within the housing 602. The piston is movable within the housing 602 along the longitudinal axis 606 of the housing 602. The housing 602 further includes a diaphragm 626 disposed above the piston 604. The diaphragm 626 can be composed of any suitable material, such as Nitrile rubber, natural rubber or Silicone. A fluid in an environment external to the housing 602 acts on the diaphragm 626 through an opening 608 in the housing 602. In the illustrated embodiment, the housing 602 is disposed subsea. Accordingly, the hydrostatic pressure of seawater at depth applies a force on the diaphragm 626, which moves downward and contacts the piston 604, causing the piston 604 to also move downward. However, any fluid at pressure suitable for applying a force on the diaphragm 626 such that the diaphragm 626 and piston 604 move in such a way that piston 604 applies a compressive force on the piezoelectric element is envisioned.

The piston includes an upper surface 620 and a lower surface 622. The upper surface 620 area is greater than the lower surface 622 area. Accordingly, any force acting on the upper surface 620 will be multiplied when the lower surface 622 comes into contact with another surface. The piston 604 further includes seals 624 for preventing fluid access into the interior of the housing 602 beyond the piston. In this embodiment, the piston 604 is not in direct contact with the fluid located in the environment external to the housing 602.

Figure 7:
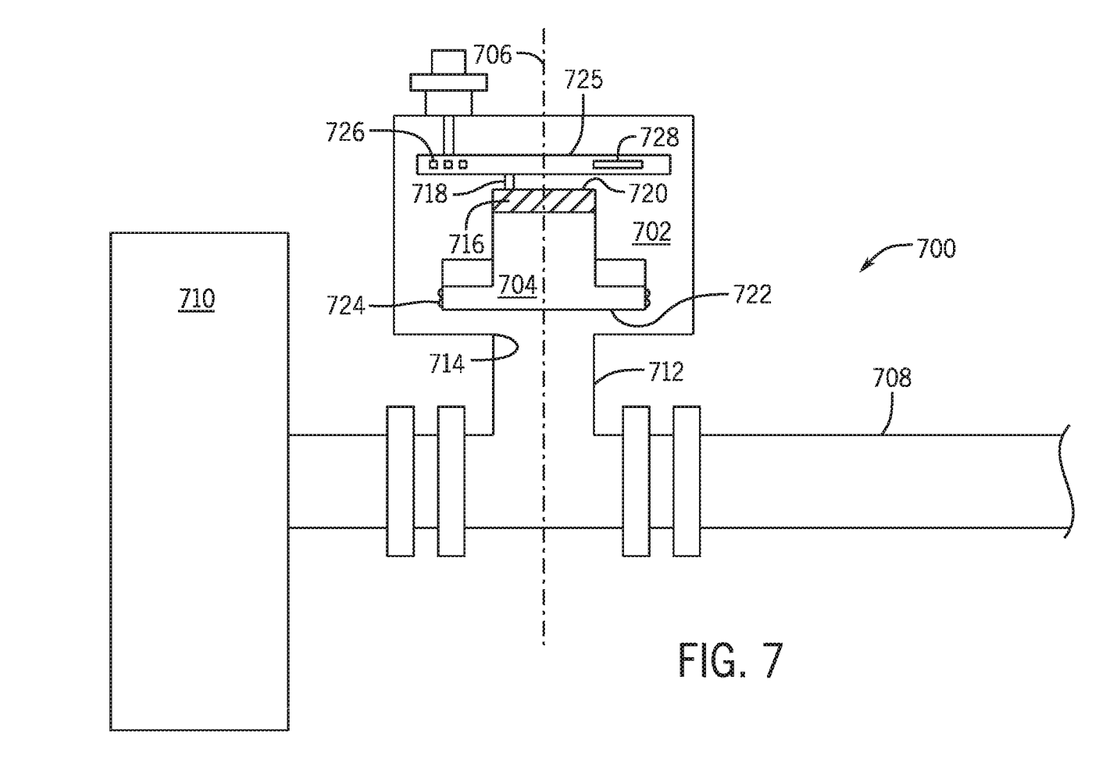
FIG. 7 is a cross-sectional view of an embodiment of a piezoelectric power generator assembly including a force-multiplying piston adjacent a T-piece fitting.

A cross-section of an example of a piezoelectric power generator assembly 700 is illustrated in FIG. 7. In the illustrated embodiment, the piezoelectric power generator assembly 700 includes a housing 702. The housing 702 can be constructed of any suitable material, including stainless steel, super-duplex stainless steel and Polyether Ether Ketone (PEEK). In addition, the housing 702 can be constructed of a piezoelectric material.

The housing 702 includes a piston 704 disposed within the housing 702. The piston is movable within the housing 702 along the longitudinal axis 706 of the housing 702. Fluid conduit 708 conveys hydraulic fluid to hydraulically actuatable valve block assembly 710. The fluid conduit includes a T-piece fitting 712 adjacent the valve block assembly 710. The hydraulic fluid acts on the piston 704 through an opening 714 in the T-piece.

The piston includes an upper surface 720 and a lower surface 722. The lower surface 722 area is greater than the upper surface 720 area. Owing to the force multiplying effect, any force acting on the lower surface 722 will be multiplied when the upper surface 720 comes into contact with another surface. The piston 704 further includes seals 724 for preventing fluid access into the interior of the housing 702 beyond the piston.

The housing 702 further includes a piezoelectric transducer 716 composed of a piezoelectric material. Non-limiting examples of suitable piezoelectric materials include crystals (such as quartz, Berlinite and Rochelle salt) and ceramics (such as Lead Zirconate Titanate (PZT), Barium Titanate and Lithium Tantalate). However, any piezoelectric material capable of accumulating an electrical charge in response to an applied mechanical stress can be used. The piezoelectric transducer 716 is disposed above the piston 704. Accordingly, the piezoelectric transducer 716 is configured to come into physical contact with the piston 704 when the piston 704 moves upward, thereby applying a force on the piezoelectric transducer 716. As a result of the Piezoelectric Effect, the piezoelectric transducer 716 produces an electrical charge, or electricity, in response to the load. Owing to the force multiplying effect of piston 704, the force acting on the piezoelectric transducer 716 will be of greater magnitude than the force acting on the piston 704. As the force acting on the piezoelectric transducer 716 is proportional to the electrical charge generated, a greater force will generate more electrical charge.

The generated electrical charge can be passed via wires 718 to any electrically powered device or to a capacitor bank for storage. Such electrically powered devices or capacitors may be local (e.g., on the housing 702), or may be remote (e.g., many feet or miles away). In the illustrated embodiment, the electrical charge is passed to an electronics module 725. The electronics module 725 includes a capacitor bank 726 for storing the generated electricity and a power conditioning unit 728 for improving the quality of the electrical power delivered to other devices.

In addition to the embodiments described above, many examples of specific combinations are within the scope of the disclosure, some of which are detailed below:

EXAMPLE 1

A piezoelectric power generator assembly comprising:
a housing comprising a flow passage defined within the housing; and a piezoelectric transducer located in the housing and configured to be in contact with a fluid contained in the flow passage, wherein the piezoelectric transducer is configured to generate an electrical charge when contacted by the fluid.

EXAMPLE 2

The power generator assembly of Example 1, wherein the flow passage has a circular profile and the piezoelectric transducer is located about the circumference of the flow passage.

EXAMPLE 3

The power generator assembly of Example 1 further comprising an electronics module including a capacitor bank.

EXAMPLE 4

The power generator assembly of Example 1, wherein the fluid is pressurized hydraulic fluid for operating a hydraulically actuatable device.

EXAMPLE 5

The power generator assembly of Example 4, wherein the hydraulically actuatable device is a valve.

EXAMPLE 6

The power generator assembly of Example 5, the valve comprising a sensor configured to measure a characteristic of the valve, wherein the sensor is powered by the electrical charge generated by the piezoelectric material.

EXAMPLE 7

The power generator assembly of Example 6 further comprising a storage device including a processor and a memory device capable of receiving and storing sensor measurement data.

EXAMPLE 8

The power generator assembly of Example 7, wherein the valve is configured to adjust between an open position and a closed position and the characteristic is position of the valve.

EXAMPLE 9

A piezoelectric power generator assembly comprising:
a housing;
a piezoelectric transducer located in the housing;
a piston located in the housing, the piston movable with respect to the housing and configured to be moved into contact with the piezoelectric transducer; and wherein the piezoelectric transducer is configured to generate an electrical charge when contacted by the piston.

EXAMPLE 10

The power generator assembly of Example 9 further comprising an electronics module including a capacitor bank.

EXAMPLE 11

The power generator assembly of Example 9, wherein the piston is configured to be moved when acted upon by a force external to the housing, the external force being provided by a fluid at a pressure sufficient for moving the piston.

EXAMPLE 12

The power generator assembly of Example 11, wherein the fluid is seawater.

EXAMPLE 13

The power generator assembly of Example 9 further comprising a diaphragm located in the housing and exposed to an environment external to the housing, wherein the diaphragm is configured to contact the piston when acted upon by a force external to the housing.

EXAMPLE 14

The power generator assembly of Example 9, the piston further comprising an upper surface and a lower surface, wherein the upper surface has an area that is greater than an area of the lower surface.

EXAMPLE 15

The power generator assembly of Example 9, further comprising an electrical device configured to be powered by the electrical charge.

EXAMPLE 16

The power generator assembly of Example 15, wherein the electrical device is located remotely to the housing.

EXAMPLE 17

The power generator assembly of Example 9, wherein the housing is constructed of piezoelectric material.

EXAMPLE 18

A subsea drilling system comprising:
a subsea blowout preventer stack comprising a hydraulically actuatable device and a flowline for conveying pressurized hydraulic fluid to the hydraulically actuatable device; and
a piezoelectric power generator assembly comprising:
a housing comprising a flow passage defined within the housing; and
a piezoelectric transducer located within the housing and configured to be in contact with the hydraulic fluid, wherein the piezoelectric transducer is configured to generate an electrical charge when contacted by the hydraulic fluid.

EXAMPLE 21

The power generator assembly of Example 19, wherein the hydraulically actuatable device is a ram.

EXAMPLE 22

The power generator assembly of Example 20, the ram comprising a sensor configured to measure a characteristic of the ram, wherein the sensor is powered by the electrical charge generated by the piezoelectric material.

EXAMPLE 23

The power generator assembly of Example 21 further comprising a storage device including a processor and a memory device capable of receiving and storing sensor measurement data.

While the aspects of the present disclosure may be susceptible to various modifications and alternative forms, specific embodiments have been shown by way of example in the drawings and have been described in detail herein. It should be understood that the disclosure is not intended to be limited to the particular forms disclosed. Rather, the disclosure is to cover all modifications, equivalents, and alternatives falling within the spirit and scope of the disclosure as defined by the following appended claims.

I claim:

1. A piezoelectric power generator assembly comprising:
a housing comprising an outer surface that contacts a fluid surrounding the housing and an inner surface that defines a recess;
a piezoelectric transducer located in the recess of the housing; and
a piston located in the recess of the housing, the piston movable with respect to the housing;
wherein the housing comprises an opening formed in the outer surface that enables the fluid to contact a first surface of the piston to drive the piston toward the piezoelectric transducer, thereby causing a second surface of the piston opposite the first surface to contact the piezoelectric transducer, and the piezoelectric transducer is configured to generate an electrical charge when contacted by the piston.

2. The power generator assembly of claim 1, comprising an electronics module comprising a capacitor bank.

3. The power generator assembly of claim 1, wherein the fluid is seawater while the housing is positioned at a subsea location.

4. The power generator assembly of claim 1, wherein the first surface has an area that is greater than an area of the second surface.

5. The power generator assembly of claim 1, comprising an electrical device configured to be powered by the electrical charge.

6. The power generator assembly of claim 5, wherein the electrical device is located remotely to the housing.

7. The power generator assembly of claim 1, wherein the housing comprises a piezoelectric material.

8. The power generator assembly of claim 1, wherein the piston is configured to move along a longitudinal axis, and the piston is positioned between the opening and the piezoelectric transducer along the longitudinal axis.

9. The power generator assembly of claim 8, wherein each of the opening, the piston, and the piezoelectric transducer are centered about the longitudinal axis.

10. The power generator assembly of claim 1, comprising a sensor configured to monitor a characteristic of a hydraulically actuatable device, wherein the sensor is powered by the electrical charge generated by the piezoelectric transducer.

11. The power generator assembly of claim 1, comprising an annular seal extending between an outer annular surface of the piston and an inner annular surface of the recess of the housing, wherein the annular seal is configured to isolate the piezoelectric transducer from the fluid surrounding the housing.

12. A method of operating a piezoelectric power generator assembly comprising:
submerging a housing of the piezoelectric power generator within a pressurized fluid;
driving, via the pressurized fluid, a first surface of a piston supported by the housing to drive the piston toward a piezoelectric transducer positioned in the housing thereby causing a second surface of the piston opposite the first surface to contact the piezoelectric transducer; and
generating an electrical charge with the piezoelectric transducer in response to mechanical stress applied to the piezoelectric transducer by the piston.

13. The method of claim 12, wherein the pressurized fluid comprises seawater that surrounds the housing when the housing is positioned at a subsea location.

14. The method of claim 12, wherein the pressurized fluid flows through an opening in the housing to drive the piston into contact with the piezoelectric transducer.

15. The method of claim 12, comprising using the electrical charge to power a sensor to monitor a condition of a hydraulically actuatable device of a subsea blowout preventer stack.

16. The method of claim 15, comprising powering the sensor with only the electrical charge generated by the piezoelectric transducer.

* * * * *